United States Patent [19]

Stewart

[11] 4,338,520

[45] Jul. 6, 1982

[54] METHOD OF AND APPARATUS FOR ANALYZING GAS FLOWS INSIDE HOLLOW BODIES

[75] Inventor: Peter A. E. Stewart, Bristol, England

[73] Assignee: Rolls Royce Limited, London, England

[21] Appl. No.: 146,393

[22] Filed: May 5, 1980

[30] Foreign Application Priority Data

May 18, 1979 [GB] United Kingdom ............... 7917336

[51] Int. Cl.³ ............................................. G01F 1/00
[52] U.S. Cl. ................................. 250/356; 250/303; 250/435; 364/510
[58] Field of Search ........... 250/356, 260, 303, 432 R, 250/435, 266; 364/510

[56] References Cited

U.S. PATENT DOCUMENTS

| | | | |
|---|---|---|---|
| 2,841,713 | 7/1958 | Howard | 250/356 |
| 2,968,721 | 1/1961 | Shapiro et al. | 250/356 X |
| 4,057,720 | 11/1977 | Paap et al. | 250/266 |
| 4,161,655 | 7/1979 | Cotic et al. | 250/385 |

*Primary Examiner*—Davis L. Willis
*Attorney, Agent, or Firm*—Stevens, Davis, Miller & Mosher

[57] ABSTRACT

In order to produce a visual image on a screen of the movement of gas flows inside hollow bodies, e.g. gas turbine or internal combustion engines, or wind tunnels, a gaseous tracer material including a short-lived radioactive isotope is injected into the hollow body. Radiation detectors 32 are positioned around a gas turbine engine 10 and linked to a computer 36 which is programmed using an image reconstruction algorithm to reconstruct the flow path of the isotope in suitable form. One suitable isotope is produced by irradiating carbon tetrafluoride using a stream of deuterons from a cyclotron 12. The resulting reaction produces an isotope of Fluorine which has a half-life of 11.56 seconds, and decays producing radiation at approximately 1.6 Mev. The activity of the isotope is raised to the highest feasible level by continuously irradiating the tracer material in a chamber 14 as it is pumped around a circuit prior to injection. The half lives of the isotopes used are in the range 3 seconds to 2 minutes.

10 Claims, 1 Drawing Figure

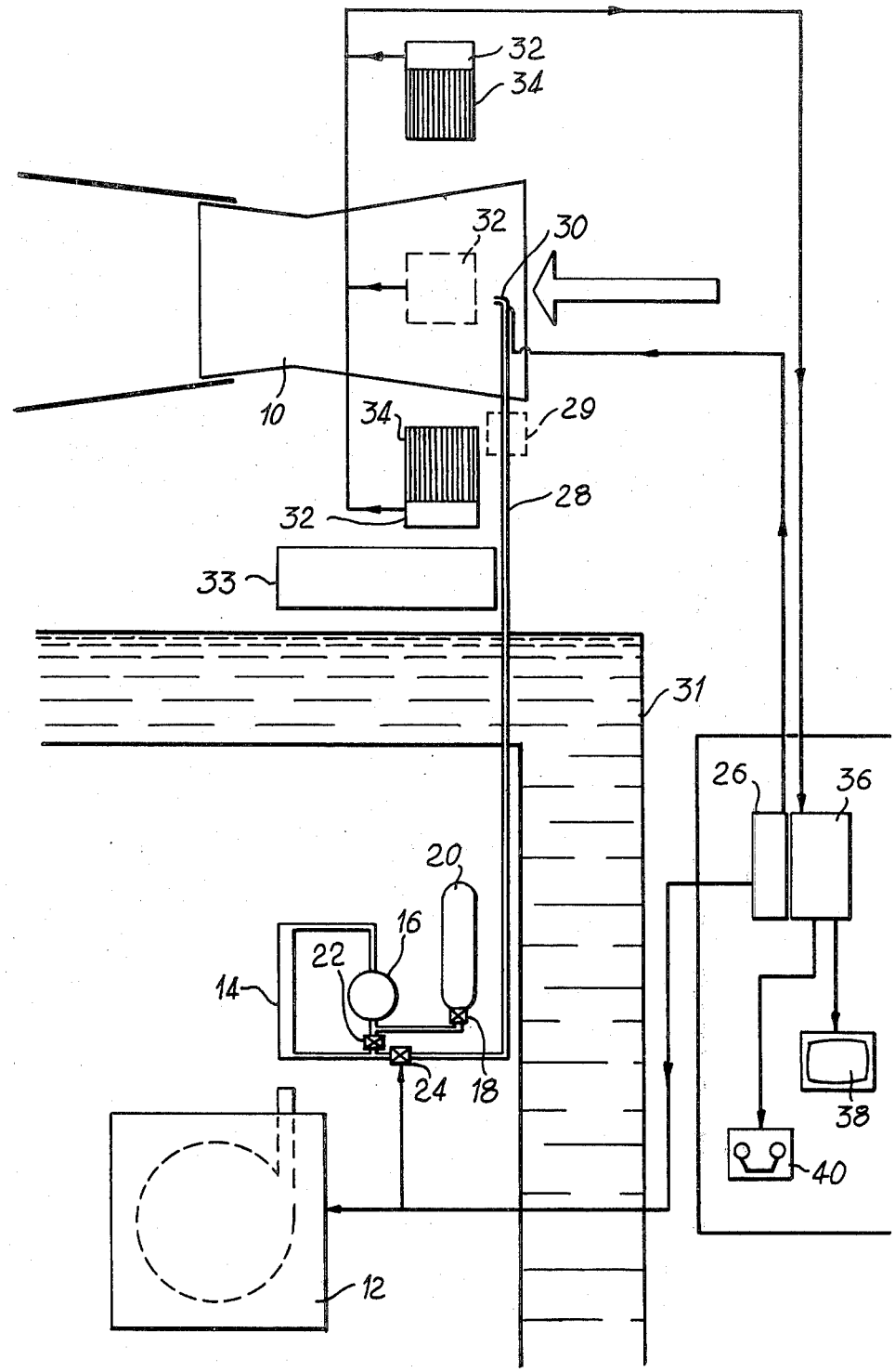

METHOD OF AND APPARATUS FOR ANALYSING GAS FLOWS INSIDE HOLLOW BODIES

DESCRIPTION

The present invention relates to a method of, and apparatus for, analysing gas flows inside bodies such as engine, wind tunnels, and test rigs.

It is known to use real time x-ray television imaging systems to detect movements of metallic components within casings such as engine casings, and it is also known using neutron sources to provide real-time television images of the flows of liquids containing hydrocarbons inside engines, e.g. in oil and fuel systems. What has not so far been possible is the tracking and measurement of gas flows within closed bodies or engines.

Both of the above-described systems have involved passing x-rays or neutrons through the engine from one side, and using x-ray and neutron sensitive screens to detect them as they emerge from the engine at the other side. Currently however, we know of no radiation which is absorbed by air or other gases in sufficient quantities to enable these methods to be extended to gas flow analysis.

A method of analysis is known, for example in medical treatments which involves injecting a radio active tracer element into the bloodstream and detecting whether or not it reaches a certain part of the body by placing detectors around that part.

The techniques used in medicine are however constrained by fact that the body being investigated is a human body, so that these techniques do not read across the engineering applications although much of the equipment used in the medical field can still be applied.

For example, in medical diagnosis the tracer material is injected into the bloodstream and travels through the body, being absorbed by various organs on the way. After a suitable period the detectors are used to scan the organs using the remaining radioactivity of the tracer in the organ to build up a picture of the organ. This process necessarily takes time so that the half-lives of the isotopes used range from several minutes up to an hour or more. Also, the radio-active material is retained in the body at least until the radio-activity of the isotope has decayed to a harmless level, so that there is no pollution problem. Further the energy of the radiation used must be kept to relatively low levels to minimise the health risk to the patient.

In contrast to this, the problem to be solved by the present invention is to provide a technique for the real time analysis of a gas flow inside a hollow body for example a gas turbine engine, to provide information in three dimensions of the track followed by the gas as it passes through the engine. The difficulties to be overcome are the speed with which the gases move in the engine, the diffusion of the gas flow within the body and the fact that the tracer will contaminate the exhaust gases which are released to atmosphere and possibly will also contaminate parts of the engine which results in a pollution hazard.

The present invention overcomes these difficulties by using isotopes specially selected for their short half-lives and the high energy of the radiation which they produce, and by arranging for the irradiation of the tracer material to take place both in a manner which produces the highest feasible activity in the isotope and in a manner which enables the tracer material to be injected into the engine from the irradiation chamber in a very short time.

According to the present invention a method of tracking the flow of gas inside a hollow body comprises the steps of:

(1) irradiating a quantity of suitable fluid in a chamber with nuclear particles to produce a quantity of a radioactive isotope having a half-life in the range of three seconds to two minutes, and which also emits radiation at an energy level of at least 100 Kev., (2) injecting a quantity of irradiated trace fluid directly from said chamber into said gas flow in the form of a thin filament, (3) detecting the flow path of the filament of tracer fluid as it moves within the hollow body by means of radiation detection apparatus mounted outside the body and directed at the expected path of the gas flow within the body and, (4) making a record of the output of the detectors whereby the progress of the filament of tracer fluid within the gas flow can be subsequently analysed and measured.

Also according to the present invention there is provided apparatus for tracking the flow of gas within a hollow body comprising means for producing a stream of nuclear particles, means for feeding a suitable fluid into the path of the stream of particles to irradiate the fluid to produce a radio-active isotope having a half-life in the range 3 seconds to 2 minutes and which emits radiation at an energy level of at least 100 Kev. means for injecting the fluid containing the isotope into an appropriate portion of the gas flow to be tracked within the hollow body in the form of a filament of tracer fluid, detection apparatus mounted around the outside of the hollow body and directed at the expected path of the gas flow within the hollow body to detect the movement of the filament of tracer fluid within the body, and means for making a record of the flow path of the isotope for subsequent analysis and measurement using the output from the detectors.

In order to avoid serious contamination of the engine which may affect personnel on the test site, and to avoid pollution of the atmosphere which may affect local populations, isotopes with half-lives of twenty seconds or less are preferable. If the test site is in a remote area longer half-lives may be used without providing a significant pollution problem.

The isotopes can be produced by either neutron or charged particle bombardment of suitable targets. Neutron bombardment is the better known technique and for some applications can yield suitable isotope activity, but due to the isotropic emission of the neutrons produced by a neutron generator, the neutron flux produces insufficient activity in the isotopes to enable real time analysis to be carried out in gases at high flow rates. A preferred charged particle source is thus a cyclotron. These machines are commercially available and can produce a variety of charged particles suitable for irradiating materials to produce isotopes of the required properties.

Throughout this specification the reference to the activity of the isotopes should be taken to be reference to the rate of decay of the isotope i.e. the number of emissions per unit time.

Decaying isotopes in general produce gamma radiation and several forms of detectors are available to detect this type of radiation, for example, scintillation counters using sodium iodide crystals, or x-ray sensitive photo-diodes. The most suitable detector at present, however is the newly developed multi-stage, multi-wire proportional counter (MWPC). The detectors are mounted at least at two locations around the body and extend along the length of the body to build up a three-dimensional trace of the isotope as it passes the detectors. Preferably three detectors are used and are equally spaced around the engine.

The output signals of the detectors, which correspond to the number of times each detector sees the gamma radiation of the decaying isotope, provide a density plot of the radiation level from different positions as seen by the detectors. This information is digitised and passed to a computer programmed using an image recontruction algorithm to produce information in any convenient form e.g. a visual track on a screen, and is, in addition, passed to a recording device.

The invention will now be more particularly described with reference to the accompanying drawing in which there is shown diagrammatically a system for tracking and visualising the flow of gas in a region of a gas turbine engine.

Selection of the isotope to be used as the tracer depends on the application, but considering the application to gas flow analysis in a gas turbine engine the criteria to be satisfied are:

(1) because the tracer will be ejected into the atmosphere with the engine exhaust, the half-life of the isotope must be sufficiently long to allow the necessary measurements to be taken, but also sufficiently short that it has substantially fully decayed before any contact can be made with the nearest population. A minimum half-life of about three seconds will be necessary after injection to obtain readings, but half-lives of up to two minutes may be used depending on the location of the test site. To avoid infringing environmental health regulations and to avoid danger to the test personnel the maximum half-life is preferably of the order of twenty seconds.

(2) the energy level of the emitted radiation has to be sufficient to penetrate the walls of the engine, and it must be of a type which can be detected readily.

(3) the tracer fluid which is injected into the engine must not have any significant detrimental reaction with the component parts of, or gases within the engine and its density must also be compatible with that of the gas flow into which it is injected so that the tracer fluid accurately follows the movements of the gas flow.

(4) because of (1) above, the irradiation must be capable of being carried out on the engine test site adjacent to the engine so that the tracer fluid is available for immediate injection into the engine. This means that preferably the particles are capable of production from a portable generator.

Suitable isotopes so far identified are the $16_N$ isotope of Nitrogen, the $15_O$ isotope of Oxygen and the $20_F$ isotope of Fluorine. The reactions required to produce these isotopes are, $16_O$ (n, p) $16_N$ which entails neutron bombardment of Oxygen using either a nuclear reactor or a portable neutron generator, $14_N$ (d, n) $15_O$ and $19_F$ (d, p) $20_F$ which entail deuteron bombardment of Nitrogen or Fluorine atoms respectively using a Cyclotron. A suitable portable neutron generator is available on the market as for example is sold by the Haefely Company, and a suitable Cyclotron is commercially available as sold by the Cyclotron Corporation in U.S.A.

Referring now to the drawing there is shown in diagrammatic form a gas turbine engine 10 the gas flow in which is to be analysed.

A cyclotron 12 is arranged to irradiate the tracer material which is circulated through a chamber 14 by a pump 16, which in turn is supplied via a valve 18 from a bottle 20 of compressed gas. The cyclotron produces a beam of deuterons which are directed along the length of the chamber 14 to give maximum exposure of the tracer fluid to the beam. The chamber forms part of a loop through which the tracer fluid is continuously pumped while being irradiated until the desired activity is reached. Additional valves 22 and 24 are provided to prevent escape of the tracer fluid from the loop until it is ready for injection into the engine. During the irradiation procedure therefore valve 22 will be open and valves 18 and 24 will be closed.

Depending on the region of the engine which is to be investigated, it may be necessary to introduce an additional pump and/or temperature controlling devices (shown diagrammatically at 29) between the valve 24 and the injector 30, in order to make the temperature and pressure of the injected fluid compatible with the gas flow into which it is injected. For example, a low pressure compressor or fan operates at temperatures up to 100° C. and pressures up to 1¼ atmospheres. Whereas the temperatures and pressures in the combustion region are up to 1300° C. and 25 atmosphere.

It is to be noted that the higher the pressure of the tracer fluid, the higher the activity of the isotope in terms of Curies per cc. It is beneficial therefore to irradiate the fluid in the chamber 14 at the highest possible pressure so that larger quantities of the tracer material are available for use.

When the tracer fluid is to be injected valve 22 is closed and valves 18 and 24 are opened under the control of a control system 26, so that the requisite amount of tracer gas is injected into the engine, and is replaced in the loop from the supply.

The cyclotron may be turned off at this stage so that when all the radioactive gas has been injected into the engine, it will be followed by non-radioactive gas which acts to purge the system.

The tracer gas is conveyed from the chamber to the engine 10 though a pipe 28 which is of small bore to reduce the transfer time. An injector 30 regulated by the control box 26 injects the tracer gas into the desired area of the engine in the form of the thin filament, which is picked up by the gas flow and follows the movement thereof. The filament gradually diffuses into the flow.

The area around the test cell and the control room is shielded from the radioactive materials by a thick layer of water 31, and in addition the detectors 32 are shielded by thick lead shields 33 to prevent stray radiation affecting them. For the same reason the pipe 28 should also be shielded.

Detectors 32 are provided at three locations around the area of the engine into which the tracer material is injected so that the regions of radioactivity within the engine can be determined in three dimensions.

Heavy metal collimators 34, in the form of steel reinforced lead tubes, are disposed between the detectors 32 and the engine to restrict the field of view of each small area of the detector, so that spatial resolution of the gas filament can be achieved.

The detectors are multi-stage multi-wire proportional counters which are known per se and are not therefore described in detail. A description of their construction and operation is given in the specification to U.K. patent application No. 26595/77. The detectors produce signals which are representative of the number of gamma particles which strike the various areas of the detector at the ends of the collimators. The signals are passed to a computer 36 which is programmed in known manner, using an image reconstruction algorithm to produce a visual track on a T.V. screen 38. An example of such an algorithm is that ART algorithm which is described in an article entitled "A Tutorial on ART (Algebranic Reconstruction Techniques)" in the Transactions on Nuclear Science of the IEEE (Institute of Electrical and Electronic Engineers) Volume NS-21 dated June 1974 pp 78–93.

The detectors may be orientated either to provide vertical and horizontal grids, or disposed at 120° apart around the engine to provide three intersecting grids. The output from each detector provides information as to the prescence or absence of the radioactive tracer gas in the view angle dictated by each of the collimators 34, and adjacent detector points provide information on the variation in intensity of the radiation, and thus the extent of diffusion.

The computer is programmed to accept the information from the grids and to identify the center line of the filament being tracked, and its spatial position within the engine. An isometric view of the engine configuration in the field of view of the detector may be stored in the computer and displayed on the screen with the representation of the movement of the filament.

Alternatively, due to the radial symmetry of the engine, only the radial and longitudinal positions of the tracer gas as seen at various locations on the detector need be displayed superimposed on a radiographic or fluoroscopic image of the region of the engine being investigated obtained by conventional High Energy X-radiography. The swirl component of the motion of the tracer material may be represented by a change of color of the image on the screen as the filament moves angularly from one sector of the engine to another.

A recording of the image is simultaneously made on a recording device 40 which, in this example, is shown as a video tape recorder, but which may be of any other suitable type, for example, a magnetic disc recorder.

The tracer fluid used in this example is carbon tetra fluoride ($CF_4$) gas which, in the small quantities to be used, is not expected to have any harmful effect on the engine. Irradiation of $CF_4$ with deuterons produces the reaction, $19_F(d, p) 20_F$. The $20_F$ isotope of Fluorine has a half life of 11.56 seconds and gives off gamma radiation with an energy of 1.63 Mev. Because of the short half life of the isotope its activity must be raised to the highest feasible level in order to ensure sufficient decays in the engine to enable efficient detection to take place. Thus the deuteron bombardment of the $CF_4$ in the chamber 14 is continued for as long as necessary before injection into the engine takes place. An activity of the order of 2 Curies per second may be achieved in this manner.

An alternative tracer material which may be used is the $15_O$ isotope of Oxygen produced by the reaction $14_N(d, N) 15_O$. This isotope has a half life of two minutes and gives off beta radiation with an energy of 1.7 Mev. To produce this reaction, Nitrogen is circulated through the chamber 14 and bombarded with deuterons from the Cyclotron. The activity of this isotope is however, much lower at about 20 millicuries per cc.

Other possible reactions which are feasible for limited applications are produced by neutron bombardment of suitable target materials for example, Oxygen giving the reaction $16_O(n, p) 16_N$. A portable neutron generator is commercially available and is sold by the Haefly Company and bombardment of Oxygen by neutrons produces the $16_N$ isotope of Nitrogen which has a half life of 7.35 seconds and gives off one form of gamma radiation in the energy range 6.2 to 6.7 Mev. However, the activities of the isotopes following neutron bombardment are limited because the isotropic emission of neutrons, and it is not yet possible to produce such a concentrated beam of these particles as can be produced by a Cyclotron. Thus applications of neutron bombardment are limited to the use of longer half-life isotopes for test rig analysis where the radio-active substances used can be collected and stored until safe.

Although the minimum energy level of the radiation from the isotope has been stated to be 100 Kev, a preferred range is from 0.5 Mev. to 2 Mev. At energy levels greater than 2 Mev. detection becomes more difficult.

Some isotopes give off radiation in more than one energy range, but the detectors can be optimised during construction to detect specific energies of radiation by a suitable choice of materials.

The tracer fluid used is preferably in gaseous form but it is anticipated that in some applications of the invention highly atomised liquid may be suitable. Irradiation of the tracer in liquid form would produce a higher activity in the fluid may be beneficial.

I claim:

1. A method of visualizing the flow pattern of a gas flowing inside a hollow body comprising the steps of:
   irradiating a quantity of a suitable tracer fluid in a chamber with nuclear particles to produce a quantity of a radio-active isotope having a half-life in the range of three seconds to two minutes, and which also emits radiation at an energy level of at least 100 Kev;
   injecting a quantity of irradiated tracer fluid directly from said chamber into said gas flow in the form of a thin filament;
   detecting the presence or absence of radio-activity from the filament of tracer fluid at a plurality of spacial positions within a specified volume inside the body by means of at least two arrays of collimated detectors mounted around the outside of the body and directed at the expected path of the gas flow;
   passing the outputs of the detectors to a computer programmed to determine the instantaneous spacial co-ordinates of the source of the radio-activity detected and, using an image reconstruction algorithm, to construct a visual image of the flow pattern in at least two dimensions; and,
   making a record of the visual image for subsequent analysis and measurement.

2. A method as claimed in claim 1 and in which the fluid is irradiated with a beam of charged particles produced in a cyclotron.

3. A method as claimed in claim 2 and in which the fluid is Carbon Tetra fluoride gas and the charged particles are deuterons which produce the reaction $19_F(d, P) 20_F$ creating within the fluid the $20_F$ isotope of Fluorine which has a half-life of 11.56 seconds and emits gamma radiation of energy 1.63 Mev.

4. A method as claimed in claim 2 and in which the fluid is Nitrogen gas and the charged particles are deuterons which produce the reaction $14_N(d, n) 15_O$ creating within the fluid the $15_O$ isotope of Oxygen which has a half-life of 2 minutes and emits beat radiation of energy 1.7 Mev.

5. A method as claimed in claim 1 and in which the fluid is irradiated with neutrons from a neutron generator.

6. A method as claimed in claim 5 and in which the fluid is Oxygen and the reaction produced is $16_O (n, p) 16_N$ creating within the fluid the $16_N$ isotope of Nitrogen which has a half-life of 7.35 seconds and emits gamma radiation in the energy range 6.2 to 6.7 Mev.

7. A method as claimed in claim 1 and in which the tracer fluid is circulated around a loop including the chamber for continuous irradiation immediately prior to injection into the hollow body in order to optimise the level of activity of the isotope produced by the irradiation.

8. A method as claimed in claim 1 and in which the detectors are multi-stage, multi-wire proportional counters and are collimated to divide each of them into a plurality of sections and to restrict the field of view of each of the sections.

9. Apparatus for tracking the flow of gas within a hollow body comprising means for producing a stream of nuclear particles, means for feeding a suitable fluid into the path of the stream of particles to irradiate the fluid to produce a radio-active isotope having a half-life in the range 3 seconds to 2 minutes and which emits radiation at an energy level of at least 100 Kev., means for injecting the fluid containing the isotope into an appropriate portion of the gas flow to be tracked within the hollow body in the form of a filament of tracer fluid, detection apparatus mounted around the outside of the hollow body and directed at the expected path of the gas flow within the hollow body to detect the movement of the filament of tracer fluid within the body, and means for making a record of the flow path of the isotope for subsequent analysis and measurement using the output from the detectors.

10. A apparatus for visualizing the flow pattern of a gas flowing inside a hollow body comprising:
   means for producing a stream of nuclear particles;
   means for feeding a tracer fluid into said stream of nuclear particles;
   irradiated tracer fluid being said tracer fluid after being fed into said stream, said irradiated tracer fluid comprising a radio-active isotope having a half-life in the range of 3 seconds to 2 minutes and which emits radiation at an energy level of at least 100 Kev.;
   means for injecting a filament of the irradiated fluid into the gas flow;
   a plurality of detectors positioned around the gas flow to detect the radio-activity of said irradiated tracer fluid, each of said detectors comprising an array of collimated detectors directed at the gas flow;
   a computer means receiving the output of said detectors, said computer means being programmed to determine the instantaneous spacial co-ordinates of the source of the radio-activity detected by said detectors and programmed to construct a visual image of the tracer fluid flow pattern in at least two dimensions; and
   means for making a record of said fluid flow pattern.

* * * * *